United States Patent
Balakrishnan

(10) Patent No.: US 7,205,754 B2
(45) Date of Patent: *Apr. 17, 2007

(54) METHOD AND APPARATUS FOR A SWITCH MODE POWER SUPPLY THAT GENERATES A HIGH PULSE WIDTH MODULATION GAIN WHILE MAINTAINING LOW NOISE SENSITIVITY

(75) Inventor: Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/397,426

(22) Filed: Apr. 3, 2006

(65) Prior Publication Data

US 2006/0176039 A1 Aug. 10, 2006

Related U.S. Application Data

(63) Continuation of application No. 10/293,369, filed on Nov. 12, 2002, now Pat. No. 7,068,022.

(60) Provisional application No. 60/335,158, filed on Nov. 13, 2001.

(51) Int. Cl.
*G05F 1/46* (2006.01)
(52) U.S. Cl. ............... 323/285; 363/21.17; 323/282
(58) Field of Classification Search ............... 363/20, 363/21.01, 21.09, 21.17, 97, 131, 15, 16, 363/21.04, 21.12; 323/282, 285
See application file for complete search history.

(56) References Cited

U.S. PATENT DOCUMENTS 5,285,366 A * 2/1994 Zaretsky .................. 363/56.1
5,313,381 A * 5/1994 Balakrishnan ............... 363/147
5,461,303 A 10/1995 Leman et al.
6,154,377 A 11/2000 Balakrishnan et al.
6,212,079 B1 4/2001 Balakrishnan et al.
6,233,161 B1 5/2001 Balakrishnan et al.
6,426,886 B1 * 7/2002 Goder ...................... 363/56.1
6,597,586 B2 * 7/2003 Balakrishnan et al. ........ 363/16
7,068,022 B2 * 6/2006 Balakrishnan ............... 323/285

FOREIGN PATENT DOCUMENTS

EP 0585789 B1 8/1995

OTHER PUBLICATIONS

Balakrishnan, B., "Three Terminal Off-Line Switching Regulator Reduces Cost and Parts Count," Power Conversion, Sep. 1994 Proceedings, pp. 267-279.
EP02257806 European Search Report dated Apr. 26, 2005.

* cited by examiner

*Primary Examiner*—Gary L. Laxton
(74) *Attorney, Agent, or Firm*—Blakely, Sokoloff, Taylor & Zafman LLP

(57) ABSTRACT

A power supply with high pulse width modulation gain and low noise sensitivity has been disclosed. In one example, a control current is received at a control terminal of a regulator circuit. The control current includes a consumption current of the regulator circuit and a feedback current. A duty cycle at which a power switch is switched is adjusted in response to the feedback current. The consumption current of the regulator circuit is increased during an on-time of the power switch in response to the duty cycle at which the power switch is switched.

5 Claims, 6 Drawing Sheets

Figure 5. Regulator Circuit Including Power Switch Block Diagram

METHOD AND APPARATUS FOR A SWITCH MODE POWER SUPPLY THAT GENERATES A HIGH PULSE WIDTH MODULATION GAIN WHILE MAINTAINING LOW NOISE SENSITIVITY

REFERENCE TO PRIOR APPLICATION

This application is a continuation of U.S. application Ser. No. 10/293,369, filed Nov. 12, 2002, now U.S. Pat. No. 7,068,022, claims priority to U.S. provisional application Ser. No. 60/335,158, filed Nov. 13, 2001, entitled "Method And Apparatus For A Switch Mode Power Supply That Generates A High Pulse Width Modulation While Maintaining Low Noise Sensitivity."

BACKGROUND OF THE INVENTION

1. Field of the Invention

This invention relates generally to power supplies and, more specifically, the present invention relates to a switched mode power supply.

2. Background Information

A form of power supply that is highly efficient and at the same time provides good output regulation to supply power to electronic devices is the switched-mode power supply. In many electronic device applications, an approximately constant voltage output characteristic is required. In order to achieve this goal, a regulator circuit with a high PWM (Pulse Width Modulation) gain is desirable.

The method of generating an approximately constant voltage output characteristic involves adjusting the duty cycle as a function of control (or feedback) current the regulator circuit receives. The slope of the duty cycle as a function of the control current is the PWM gain. A shunt regulator current is the control current in excess of the internal consumption of the chip. The regulator circuit maintains an approximately constant power supply output voltage by modulating the duty cycle based on the shunt regulator current in excess of a threshold. The pulse width can be modulated in either voltage mode or current mode. One known regulator circuit implements a voltage-mode control loop by driving a power switch with a duty cycle inversely proportional to the shunt regulator current in excess of the threshold which generates a voltage level. This voltage level is set by the current through a resistor. The current in this resistor is substantially zero until a shunt regulator current threshold is reached. The resistor current is only responsive to shunt regulator currents greater than the shunt regulator current threshold.

The voltage level signal is filtered by an RC network to reduce the effect of switching noise. This filtered voltage level signal is compared with an internal oscillator saw-tooth waveform to generate the duty cycle waveform. As the shunt regulator current increases, the duty cycle decreases. A clock signal from the oscillator sets a latch, which turns on the power switch. The pulse width modulator resets the latch, turning off the power switch. Therefore, the pulse width modulator gain is the slope of the voltage level across the resistor as a function of the current across the resistor. Thus, the resistor value is the PWM gain. In order to increase the gain (to increase the slope of duty cycle as a function of control current), it is simply required that the value of the resistor be increased. However, by simply increasing the value of the resistance the circuitry will become more noise sensitive.

SUMMARY OF THE INVENTION

A power supply that generates a high pulse width modulation gain while maintaining a low noise sensitivity is disclosed. In one example, a control current is received at a control terminal of a regulator circuit. The control current includes a consumption current of the regulator circuit and a feedback current. A duty cycle at which a power switch is switched is adjusted in response to the feedback current. The consumption current of the regulator circuit is increased during an on-time of the power switch in response to the duty cycle at which the power switch is switched. Additional features and benefits of the present invention will become apparent from the detailed description and figures set forth below.

BRIEF DESCRIPTION OF THE DRAWINGS

The present invention detailed illustrated by way of example and not limitation in the accompanying figures.

DETAILED DESCRIPTION

Figure 1:
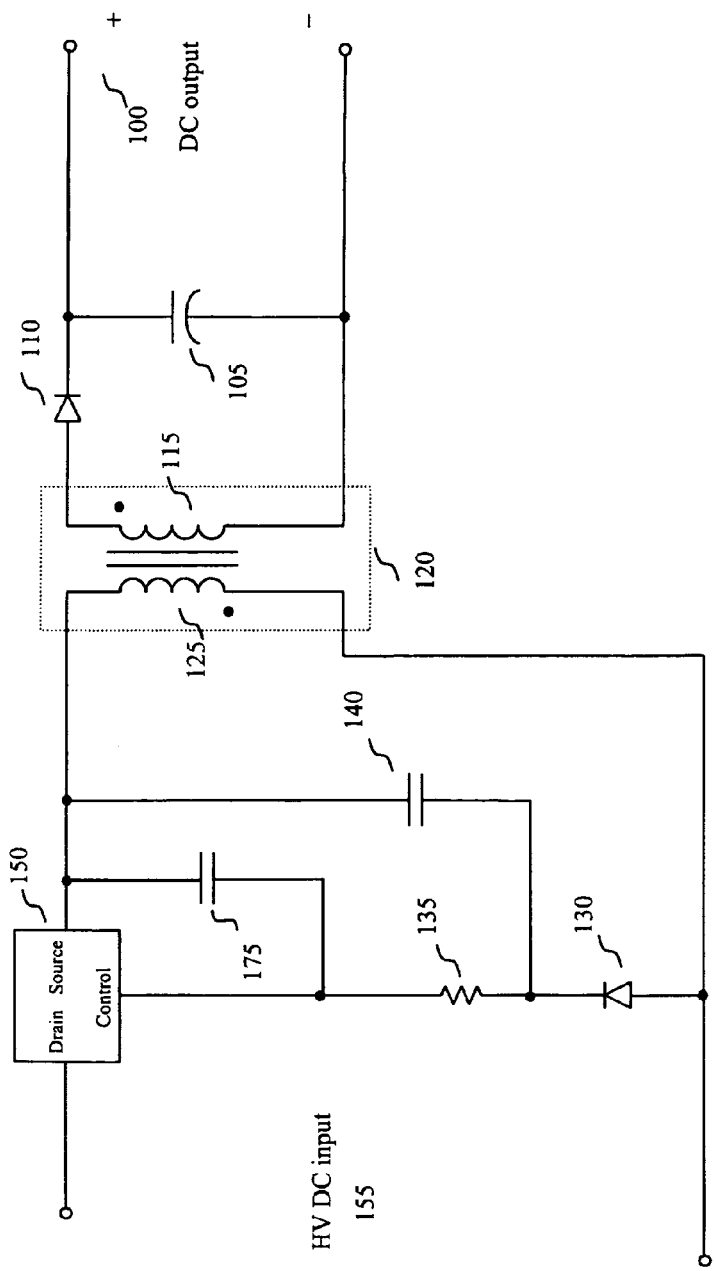
FIG. 1 shows one embodiment of a power supply that has an approximately constant voltage and constant current output characteristic in accordance with the teachings of the present invention.

Embodiments of methods and apparatuses for maintaining a power supply output current substantially constant independent of input voltage at the point where the power supply output characteristic transitions from providing an approximately constant output voltage to supplying an approximately constant output current are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As an overview, embodiments of the present invention are directed to power supply regulator circuits that provide high PWM (Pulse Width Modulation) gain while at the same time maintain low noise sensitivity. In one embodiment, a method of increasing PWM gain of a regulator circuit without increasing noise sensitivity is provided by making the consumption current of the regulator circuit increase as a function of the duty cycle. Thus at higher duty cycles, the consumption current will be higher and less current will reach the shunt regulator, resulting in an increase in PWM gain. In one embodiment, this is done by connecting a resistor either from the gate of the power switch to ground or to any node in the regulator circuit that has a signal representing the signal on the control terminal of the power switch and ground. At higher duty cycles, the gate voltage will stay high for a longer period of time, increasing the consumption current of the regulator circuit by an amount proportional to the duty cycle. At lower duty cycles, the gate voltage will stay high for a shorter period of time, thus having less affect on the consumption current of the regulator circuit Since the shunt regulator current is the control current in excess of the consumption current of the regulator circuit, the current through the resistor adds to the consumption current or internal consumption of the regulator circuit. Thus, at high duty cycle, the internal current consumption is higher than at low duty cycle where the current through the resistor has minimal effect. The increased internal consumption due to the gate to ground resistor will serve to increase the threshold at which the control current starts reducing the duty cycle from its maximum. However, the threshold at which the control current will stop modulating the duty cycle will remain substantially the same, because at lowest duty cycle the gate of the power switch to ground resistor has little or no effect. Since more control current is needed to start reducing the duty cycle, but the duty cycle stops reducing at the same level as without the power switch gate to ground resistor, the PWM gain is increased.

In one embodiment, the current subtracted from the control current need not necessarily be the consumption current of the regulator circuit to realize benefits according to the teachings of the present invention. For example, in one embodiment, any subtraction current that varies with duty cycle of the power switch can be used in the place of consumption current. Similarly, it is appreciated of course that control current, consumption or subtraction current and the feedback current can be replaced by equivalent signals that can be voltage or current, by one skilled in the art, within the scope of this invention.

FIG. 1 shows generally one embodiment of a power supply that has an approximately constant voltage and constant current output characteristic in accordance with the teachings of the present invention. The feedback information is provided to the regulator circuit 150 at its control terminal. The regulator circuit 150 also includes a power switch connected to the terminals Drain and Source. The current at the control terminal is proportional to the voltage across resistor 135, which in turn is proportional to the DC-output voltage 100. The regulator circuit 150 reduces the duty cycle of the power switch when the voltage across resistor 135 increases above a threshold, and the DC-output 100 is in voltage regulation mode. The regulator circuit 150 reduces the current limit of the power switch when the voltage across resistor 135 decreases below a threshold. The current limit is reduced as a function of the voltage across resistor 135 to keep the output load current approximately constant. Capacitor 175 is the regulator circuit's bypass capacitor, and capacitor 140 is the storage element for the reflected voltage, that is fed via diode 130 every cycle when the power switch is in the off-state. Diode 130 and capacitor 140 also act as the voltage clamp to protect the power switch from leakage inductance spikes. On the secondary side of the energy transfer element 120, the rectifier 110 rectifies the switched energy and storage element 105 stores the energy to be available at the DC output 100.

Figure 2:
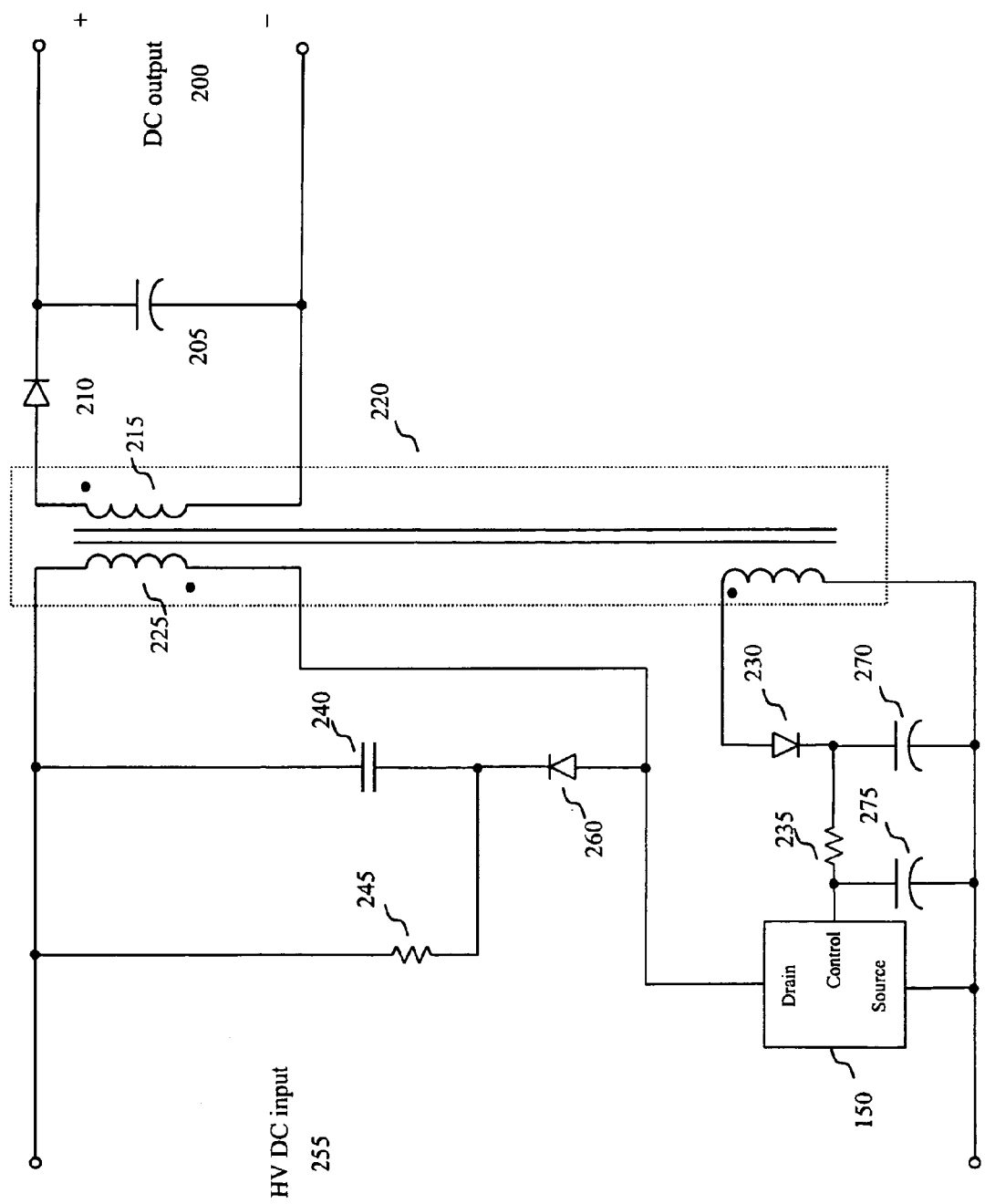
FIG. 2 shows one embodiment of a power supply where the energy transfer element has a separate feedback/bias winding for generating the control current to the regulator circuit in accordance with the teachings of the present invention.

FIG. 2 shows generally one embodiment of a power supply where the energy transfer element has a separate feedback/bias winding for generating the control current to the regulator circuit 150 in accordance with the teachings of the present invention. The power supply has an approximately constant voltage and constant current output characteristic. The feedback information is provided to the regulator circuit 150 at its control terminal. The regulator circuit also includes a power switch connected to the terminals Drain and Source. The current at the control terminal is proportional to the voltage across resistor 235, which in turn is proportional to the DC-output voltage 200. The regulator circuit 150 reduces the duty cycle of the power switch when the voltage across resistor 235 increases above a threshold, and the DC-output 200 is in voltage regulation mode. The regulator circuit 150 reduces the current limit of the power switch when the voltage across resistor 235 decreases below a threshold. The current limit is reduced as a function of the voltage across resistor 235 to keep the output load current approximately constant. Capacitor 275 is the regulator circuit's bypass storage element, and capacitor 270 is the storage element for the reflected voltage, that is fed via diode 230 every cycle when the power switch is in the off-state. Diode 260 and capacitor 240, and resistor 245 act as the voltage clamp to protect the power switch from leakage inductance spikes. On the secondary side of the energy transfer element 220, the rectifier 210 rectifies the switched energy and capacitor 205 stores the energy to be available at the DC output 200.

Figure 3:
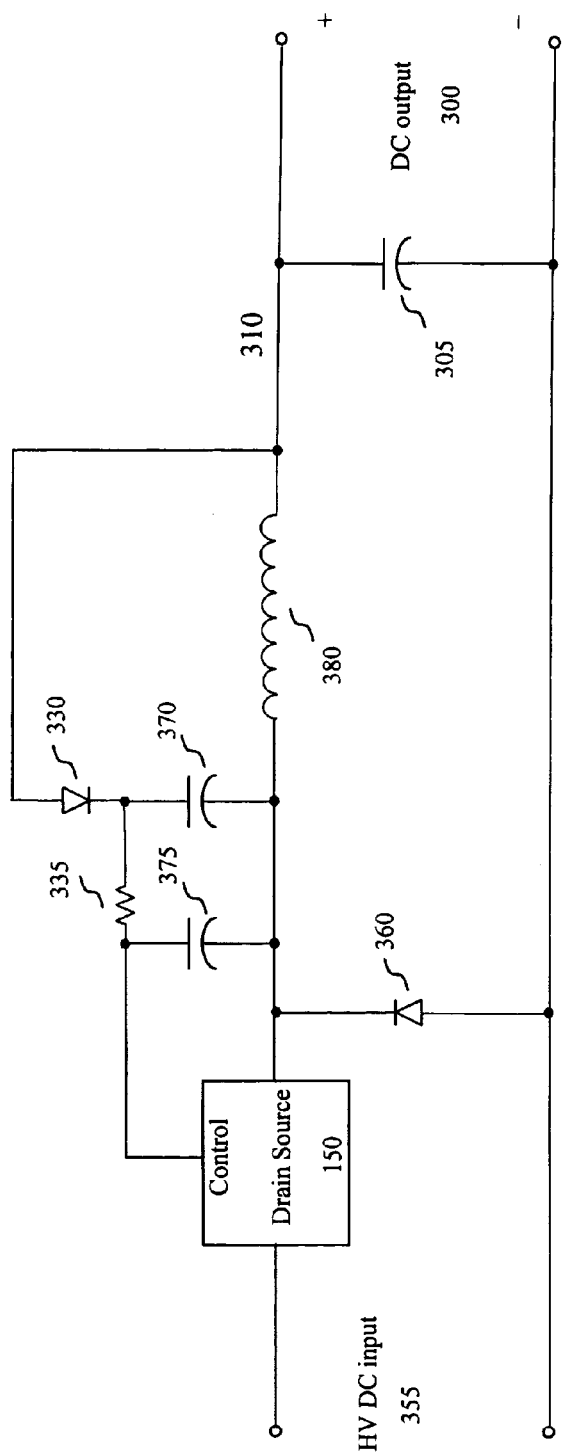
FIG. 3 shows another embodiment of a power supply that has an approximately constant voltage and constant current output characteristic in accordance with the teachings of the present invention.

FIG. 3 shows generally one embodiment of a power supply that has an approximately constant voltage and constant current output characteristic in accordance with the teachings of the present invention. The feedback information is provided to the regulator circuit 150 at its control terminal. The regulator circuit also includes a power switch connected to the terminals Drain and Source. The current at the control terminal is proportional to the voltage across resistor 335, which in turn is proportional to the DC-output voltage 300. The regulator circuit 150 reduces the duty cycle of the power switch when the voltage across resistor 335 increases above a threshold, and the DC-output 300 is in voltage regulation mode. The regulator circuit 150 reduces the current limit of the power switch when the voltage across resistor 335 decreases. The current limit is reduced as a function of the voltage across resistor 335 to control the output load current. Capacitor 375 is the regulator circuit's bypass storage element, and capacitor 370 is the storage element for the voltage on the DC output 300, that is fed back via diode 330. On one side of the inductive energy storage element 380, the energy transferred is stored in capacitor 305 to be available at the DC output 300. The inductive storage element 380 stores energy during the active part of the cycle when the controller 150 is conducting current drain to source. The stored energy will be delivered to node 310 during the inactive part of the cycle through diode 360.

Figure 4:
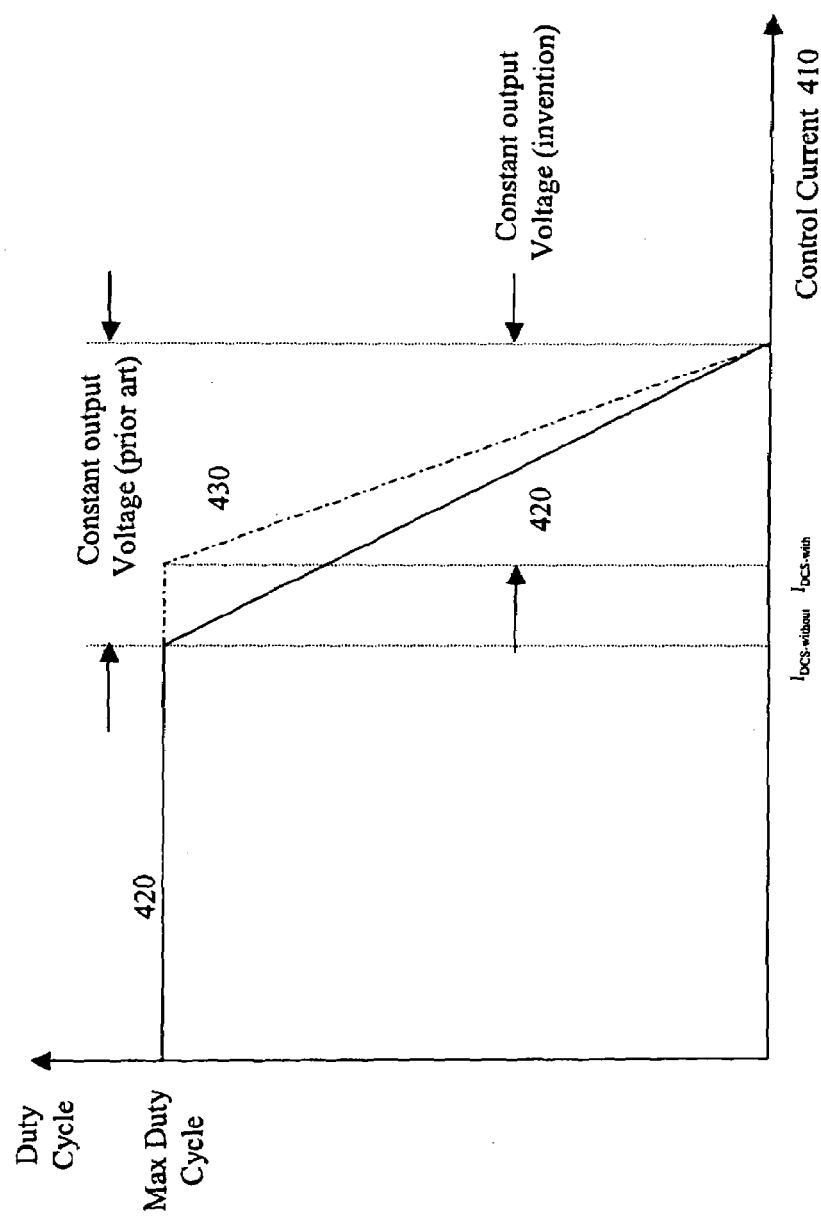
FIG. 4 shows one embodiment of the transfer function of a regulator circuit in accordance with the teachings of the present invention.

FIG. 4 shows generally the transfer function of one embodiment of the regulator circuit 150 in accordance with the teachings of the present invention. Curve 420 depicts the duty cycle as a function of the control current 410 when no gate to ground resistor is coupled to the power switch. Curve 430 is a plot of the duty cycle as a function of the control current 410 with a gate to ground resistor added to the gate of the power switch. In both curves, the duty cycle reduction occurs after the control current 410 exceeds a control current threshold ($I_{DCS-without}$ or $I_{DCS-with}$). The addition of the resistor increases the control current threshold needed to start reducing the duty cycle. However, the level of control current at which the duty cycle reduction ends is the same in both curves 420 and 430 because the resistor is no longer conducting at zero duty cycle. Thus, it has no impact at zero duty cycle. The result is higher PWM gain.

Figure 5:
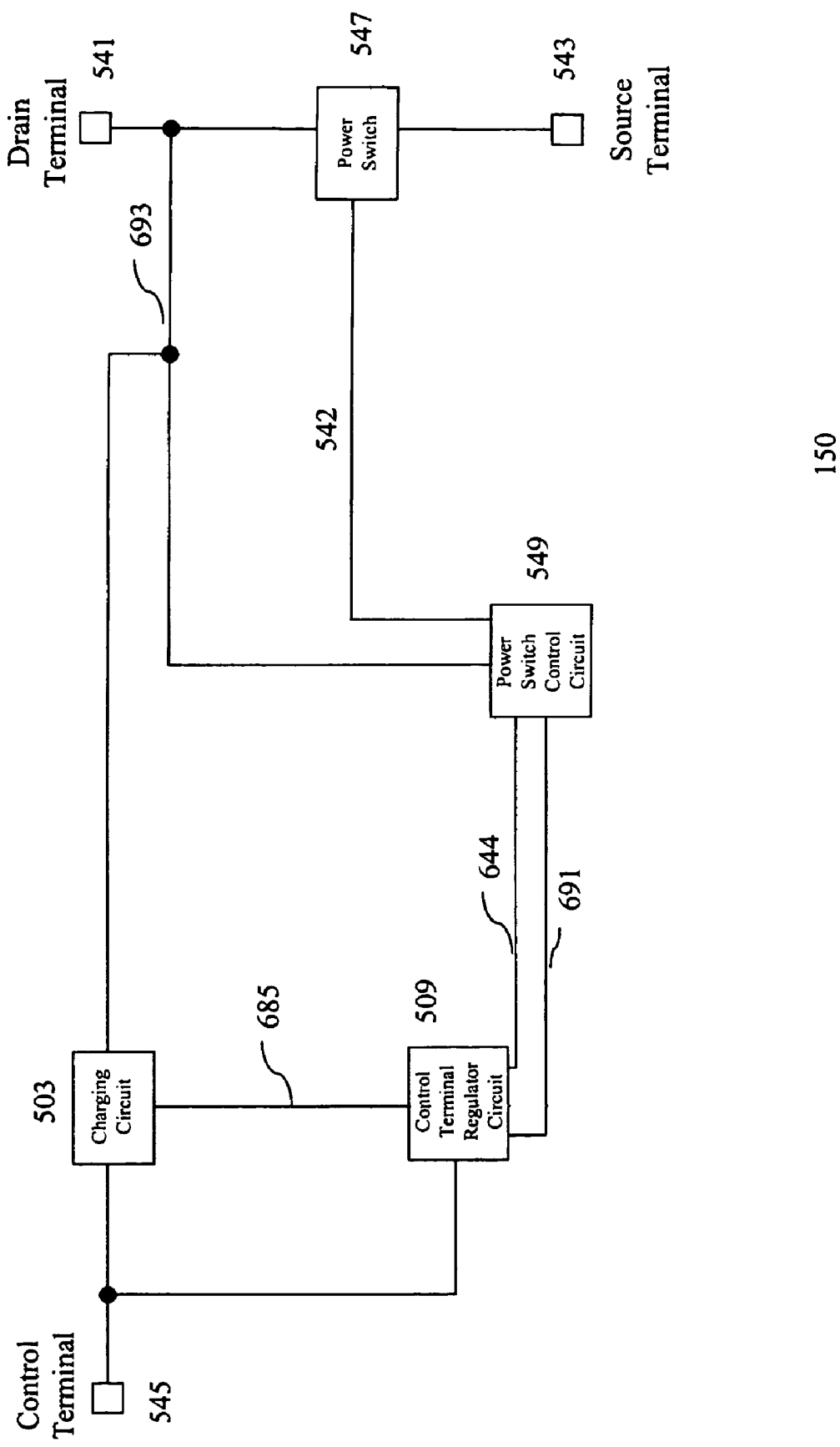
FIG. 5 is a block diagram of one embodiment of a regulator circuit including power switch in accordance with the teachings of the present invention.

FIG. 5 is a block diagram of one embodiment of regulator circuit 150, as shown for example in FIGS. 1, 2 and 3 in accordance with the teachings of the present invention. The regulator circuit 150 includes three terminals, control terminal 545, drain terminal 541, and source terminal 543. The regulator circuit also includes charging circuit 503, control terminal regulator circuit 509, power switch 547, and power switch control circuit 549. Control terminal regulator circuit 509 and charging circuit 503 maintain the control terminal 545 at a predetermined substantially constant voltage level. Control terminal regulator circuit 509 sets the voltage level at which the control terminal should be maintained. Charging circuit 503 performs the actual charging. Control terminal regulator circuit 509 also accepts the feedback based on the control current from the control terminal 545 and converts it to signals that are sent to adjust the duty cycle in power switch control circuit 549. The initiation of duty cycle adjustment is also controlled by a control current threshold. The power switch control circuit 549 determines when power switch 547 is to begin switching. Termination of switching is controlled by the magnitude of the control current and will be either duty cycle limited or current limit terminated by power switch control circuit 549. Information about the current level in the power switch is fed back to the power switch control circuit 549 via node 693.

Figure 6:
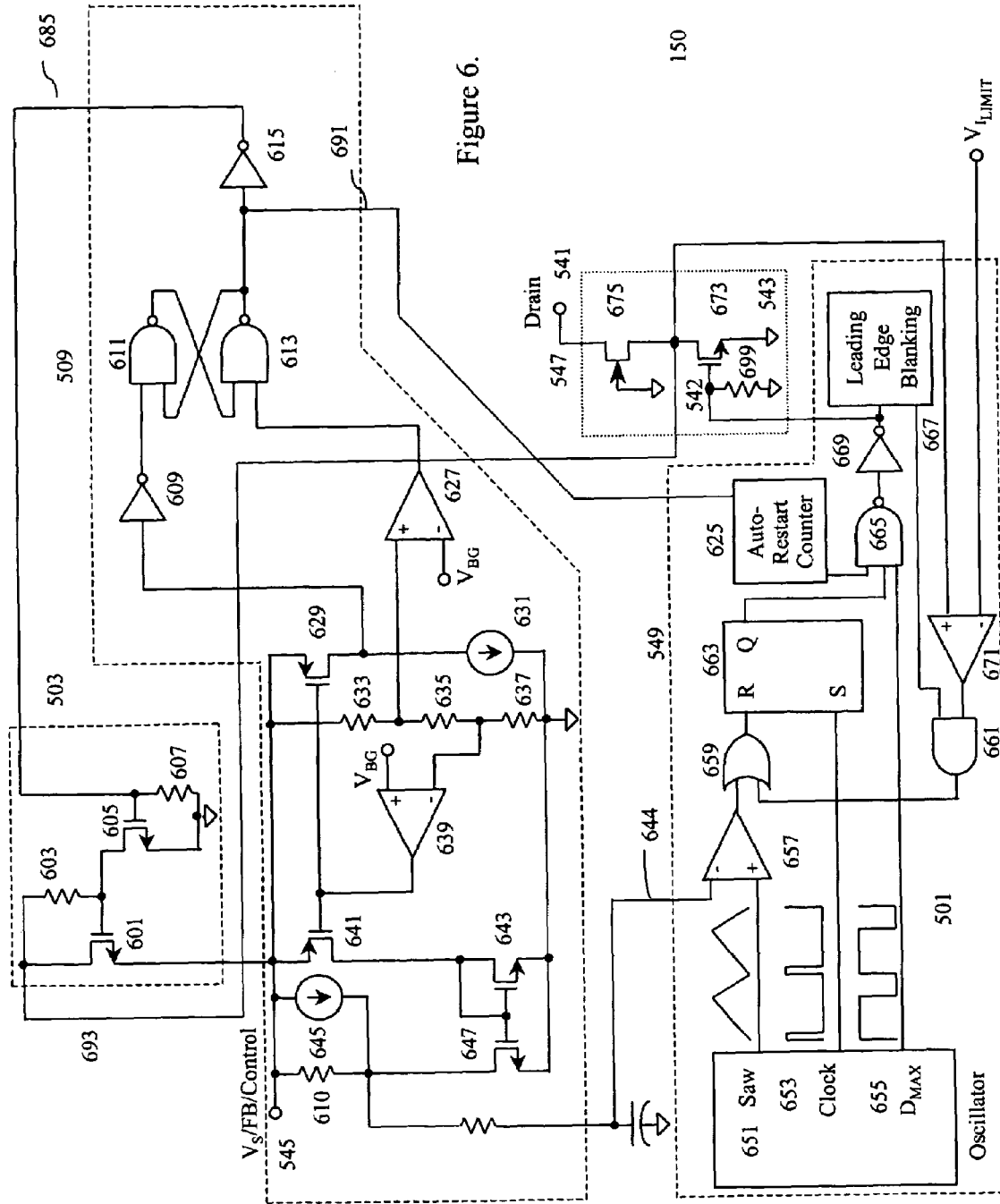
FIG. 6 is a schematic illustrating one embodiment of a power supply regulator circuit including power switch in accordance with teachings of the teachings of the present invention.

FIG. 6 is a schematic illustrating one embodiment of a power supply regulator circuit 150 in accordance with teachings of the present invention. Power switch 547 is coupled between drain terminal 541, source terminal 543 and gate terminal 542. In one embodiment, the source terminal 543 is coupled to ground. Control terminal regulator circuit 509 is coupled to control circuit 549 through signal 644. In one embodiment, control terminal 545 is the combined electrical terminal providing supply current to all blocks of the regulator circuit 150 and feedback current to the control terminal regulator circuit 509. In one embodiment, the control terminal regulator circuit 509 includes a shunt regulator block, which includes comparator 639, resistors 633, 635 and 637, and transistors 641 and 643.

In one embodiment, current limit function of regulator circuit 150 is provided by comparator 671, leading-edge blanking circuit 667 and AND gate 661. In one embodiment, the shunt regulator block 509 is used to maintain a control terminal regulation voltage at control terminal 545. In one embodiment, the control terminal regulation voltage is approximately 5.7 volts. In one embodiment, the pulse width modulator implements voltage mode control by driving the power switch with a duty cycle inversely proportional to the current into the control pin that is in excess of a shunt regulator current threshold. The shunt regulator current is the control current that exceeds the internal supply current of the regulator circuit. The shunt current passes through transistors 641 and 643. Transistors 643 and 647 form a current mirror. When the shunt current exceeds the threshold set by current source 645, the feedback signal starts modulating. The shunt current source 645 can be adjusted using trimming techniques to cancel the variations of the internal supply current of the regulator circuit 150. Hence, a constant overall control current threshold can be achieved. The current in the resistor 610 is substantially zero until the shunt regulator current threshold set by current source 645 is reached. This feedback current signal is extracted using transistor 647. The voltage at the negative input of comparator 657 of control circuit 549 is the extracted feedback voltage signal 644. This extracted feedback voltage 644 modulates the duty cycle based on the shunt regulator current signal in excess of the current source 645 threshold. When the shunt regulator current is below the current source 645 threshold, for example when the voltage at control terminal 545 is less than the regulation voltage, the voltage at the negative input of comparator 657 will stay high, and the output of comparator 657 will stay low. As the current through the shunt regulator increases, the voltage at the negative input of comparator 657 decreases linearly. The output of comparator 657 will go high at a time during the cycle determined by the shunt regulator current. When the output of comparator 657 goes high, the output of OR gate 659 will go high, and it will reset latch 663.

This circuitry maintains the duty cycle to be roughly constant up to the control current threshold for duty cycle reduction ($I_{DCS}$). If resistor 699 coupled between a gate terminal 542 of metal oxide field effect transistor (MOSFET) 673 and ground is not included, after the control current exceeds $I_{DCS-without}$, which is shown in FIG. 4, the duty cycle is linearly reduced as a function of the control current to maintain a constant output voltage. As can be appreciated, resistor 699 provides a current path from the gate terminal 542 of MOSFET 673 to ground. In another embodiment, a current source may be used in place of resistor 699. In another embodiment the resistor 699 or the current source may be connected between any node in the regulator circuit that has a signal that represents the duty cycle signal of the power switch and ground or control terminal 545. In one embodiment, a bipolar junction transistor may be used in place of MOSFET 673.

During power-up, when the voltage across the combined electrical control terminal 545 reaches the control terminal regulation voltage (e.g. 5.7 volts), transistor 629 turns on and pulls the input of inverter 609 high. The output of inverter 609 then goes low to set a latch including NAND gates 611 and 613. The output of NAND gate 613 goes low and the output of inverter 615 goes high. The gate of transistor 605 is pulled high turning on transistor 605, which pulls the gate of transistor 601 low, thereby turning off the high voltage current source of charging circuit 503. In one embodiment, the high voltage current source of charging circuit 503 includes transistor 601.

In one embodiment, the output of NAND gate 613 is also coupled to auto-restart counter 625. When the output of NAND gate 613 goes low, the output of auto-restart counter 625 goes high to enable NAND gate 665, thus enabling power switch 547 to be switched through the output of inverter 669. In one embodiment, power switch 547 includes power MOSFET 673 coupled in series with junction field effect transistor (JFET) 675 between drain terminal 541 and source terminal 543.

In one embodiment, the control terminal regulation voltage of control terminal regulator circuit 509 is set at 5.7V. In one embodiment, there is a capacitor connected externally to control terminal 545. When the switching of power switch 547 begins, the voltage at control terminal 545 would slowly drop without the charging current from charging circuit 503.

Under a fault condition, such as for example an output short or open loop, the external capacitor coupled to control terminal 545 will discharge to 4.7V and the output of comparator 627 will go low to reset the latch including of NAND gates 611 and 613, and the output of inverter 615 will go low to turn-off transistor 605. This will enable the charging circuit 503 to charge the external capacitor coupled to control terminal 545. The output of auto-restart counter 625 will also go low disabling the power switch 547 from being switched. In one embodiment, the auto-restart counter 625 can be designed to count up to for example 8 discharge/charge cycles for the output to be enabled again.

In an embodiment in which resistor 699 is included and coupled between the gate terminal 542 of the power switch 673 and ground, resistor 699 only conducts current during the on-time of power switch 673 when the gate is active high. Depending on the duty cycle the average current flowing through resistor 699 will vary. Since the current flowing through resistor 699 is part of the internal consumption current of regulator circuit 150, at higher duty cycles, the consumption current will be higher and less current will reach the shunt regulator. Consequently, resistor 699 will cause the onset of duty cycle reduction to start at higher control current. However, at minimum or zero duty cycle, the control current will be the same as without the resistor 699. Thus, the slope of the duty cycle as a function of control current will be steeper, as shown in FIG. 4 with curve 430 with higher PWM gain. In particular, since the control current starting point for duty cycle reduction is higher while the ending point remains the same, the PWM gain will become higher in magnitude.

The accuracy of the power supply output voltage and its variation with output load depends on the PWM gain of the regulator circuit 150. One way to achieve higher gain is to increase the value of resistor 610. The problem with this method is that noise in the shunt regulator, either random or non-random, will be amplified and this will result in higher duty cycle jitter at the drain terminal 541. By increasing the PWM gain through resistor 699, the value of resistor 610 can be kept low, and the feedback signal 644 will be less affected by noise in the shunt regulator. This will result in less duty cycle jitter at the drain terminal 541 for the same overall PWM gain in accordance with the teachings of the present invention.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method, comprising:
receiving a control current at a control terminal of a regulator circuit, the control current including a consumption current of the regulator circuit and a feedback current;
deriving an amount of the control current in excess of the consumption current to derive the feedback current;
adjusting a duty cycle at which a power switch is switched in response to the feedback current; and
increasing the consumption current of the regulator circuit during an on-time of the power switch in response to the duty cycle at which the power switch is switched.

2. The method of claim 1 wherein increasing the consumption current of the regulator circuit comprises directing a portion of the consumption current from the control terminal of the power switch to a ground terminal during the on-time of the power switch.

3. The method of claim 1 wherein increasing the consumption current of the regulator circuit comprises increasing the consumption current in response to an increase in the duty cycle of the power switch.

4. The method of claim 1 wherein the feedback current is proportional to an output level of a power supply output, the method further comprising regulating the power supply output in response to the duty cycle of the power switch.

5. The method of claim 4 wherein regulating the power supply output further includes regulating the power supply output to have an approximately constant output voltage and output current characteristic.

* * * * *